United States Patent
Misaka et al.

(10) Patent No.: US 7,336,846 B2
(45) Date of Patent: Feb. 26, 2008

(54) METHOD AND APPARATUS FOR PROCESSING IMAGES USING BLACK CHARACTER SUBSTITUTION

(75) Inventors: Naoyuki Misaka, Sunto-gun (JP); Hirokazu Shoda, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 744 days.

(21) Appl. No.: 10/790,009

(22) Filed: Mar. 2, 2004

(65) Prior Publication Data

US 2005/0195281 A1    Sep. 8, 2005

(51) Int. Cl.
*G06K 9/36* (2006.01)

(52) U.S. Cl. .................... 382/254; 358/518; 382/167

(58) Field of Classification Search ................. None
See application file for complete search history.

(56) References Cited

U.S. PATENT DOCUMENTS 5,045,932 A * 9/1991 Sharman et al. ............ 358/527
6,094,281 A * 7/2000 Nakai et al. ................ 358/512
6,201,616 B1 * 3/2001 Sasanuma et al. .......... 358/450
6,859,637 B2 * 2/2005 Kawai ........................ 399/367

FOREIGN PATENT DOCUMENTS

JP    2003-87556 A    3/2003

* cited by examiner

*Primary Examiner*—Brian Werner
*Assistant Examiner*—Edward Park
(74) *Attorney, Agent, or Firm*—Foley & Lardner LLP (57) ABSTRACT

An image correction section in an image processing section performs a resolution-enhancing process for an input R signal from a RED photodiode array 9R1, an input G signal from a GREEN photodiode array 9G1 and an input B signal from a BLUE photodiode array 9B1, using an input K signal from a BLACK photodiode array 9K1. The image correction section outputs four signals: an Rc1 signal, a Gc1 signal and a Bc1 signal, which are subjected to the resolution-enhancing process, and the K signal that is used for the resolution-enhancing process.

9 Claims, 10 Drawing Sheets

METHOD AND APPARATUS FOR PROCESSING IMAGES USING BLACK CHARACTER SUBSTITUTION

BACKGROUND OF THE INVENTION

1. Field of the Invention

The present invention relates to an image input apparatus that inputs image information using a 4-line CCD sensor, and an image processing method.

2. Description of the Related Art

A conventional 3-line CCD sensor having three line sensors for RED, GREEN and BLUE has been used to read a color image. The 3-line CCD sensor is configured such that color filters of RED, GREEN and BLUE are disposed on light-receiving surfaces of the respective three line sensors, and the three line sensors are arranged in a one-dimensional fashion. Thus, one location on an original cannot be read at the same time by all the line sensors. A resultant displacement in the original scan direction is corrected by performing position correction for image signals read by the respective line sensors, with use of a memory circuit comprising, e.g. a line memory.

Recently, a 4-line CCD sensor having a 4-line architecture has been marketed as a product. The 4-line CCD sensor is configured such that a monochromatic line sensor for reading a monochromatic image, which has no color filter on its light-receiving surface, is added to the aforementioned 3-line CCD sensor for reading a color image.

Jpn. Pat. Appln. KOKAI Publication No. 2003-87556 discloses a technique wherein a monochromatic original is read with a high resolution and a color original is read with a high sensitivity. In this technique, the light receiving areas of pixels are made different between a line sensor for reading a monochromatic image and three line sensors for reading a color image.

However, this CCD line sensor comprises the line sensor for reading a monochromatic image and the three line sensors for reading a color image and, compared to the line sensor for reading a monochromatic image, the three line sensors for reading a color image are unable to read one location on the original at the same time, as mentioned above. Consequently, color overlapping of a black character becomes difficult when the magnification for reading is changed or non-uniformity occurs in reading speed.

When the color original is read with high sensitivity by making the light receiving areas of pixels different between the line sensor for reading a monochromatic image and the line sensors for reading a color image, the resolution of the color original lowers. Although the resolution can be increased by simple linear interpolation, reproduction of a fine character is degraded by linear interpolation in the prior art.

BRIEF SUMMARY OF THE INVENTION

The object of an aspect of the present invention is to provide an image input apparatus and an image processing method, which can enhance the quality of image information that is input using a 4-line CCD sensor.

According to an aspect of the present invention, there is provided an image input apparatus that inputs an image of an original, comprising: photoelectric conversion means including a first line sensor and a second line sensor, the first line sensor being composed of a plurality of line sensors having different color filters on light receiving surfaces thereof, and the second line sensor having no color filter on a light receiving surface thereof; and correction means for correcting output signals from the plural line sensors of the first line sensor of the photoelectric conversion means, using an output signal from the second line sensor of the photoelectric conversion means.

According to another aspect of the present invention, there is provided an image processing method for an image input apparatus that inputs an image of an original, comprising: scanning the original using photoelectric conversion means including a first line sensor and a second line sensor, the first line sensor being composed of a plurality of line sensors having different color filters on light receiving surfaces thereof, and the second line sensor having no color filter on a light receiving surface thereof; and correcting output signals from the plural line sensors of the first line sensor, using an output signal that is produced from the second line sensor of the photoelectric conversion means by the scanning of the original.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of an aspect of the invention.

DETAILED DESCRIPTION OF THE INVENTION

Embodiments of the present invention will now be described with reference to the accompanying drawings.

Figure 1:
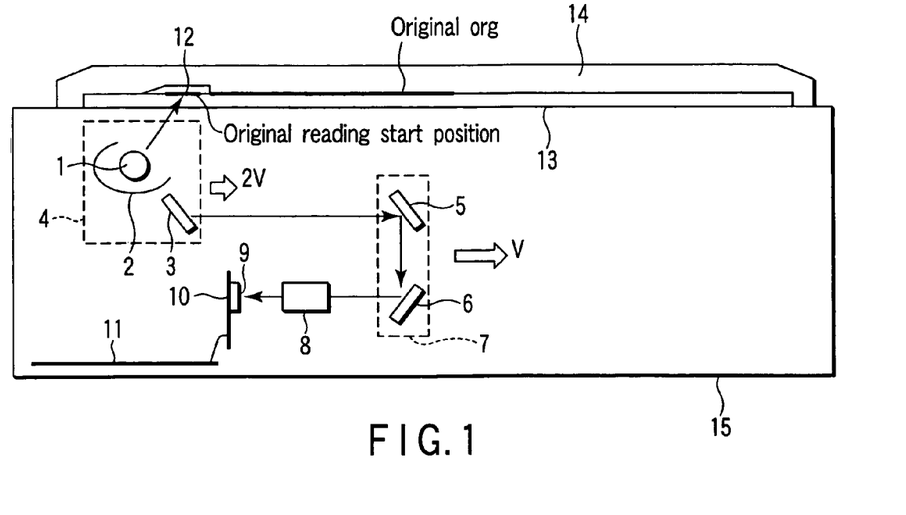
FIG. 1 schematically shows the structure of an image input apparatus according to the present invention.

FIG. 1 schematically shows the structure of an image input apparatus using a CCD line sensor. The image input apparatus, which is a general scanner, comprises a first carriage 4 including a light source 1, a reflector 2 for correcting the light distribution of the light source 1, and a first mirror 3; a second carriage 7 including a second mirror 5 and a third mirror 6; a converging lens 8; a CCD sensor board 10 on which a CCD sensor 9 is mounted; a control board 11 for controlling the CCD sensor 9 and performing various processings; a white reference plate 12 serving as a reference of white color; an original glass 13 on which an original org is placed; an original hold cover 14 for holding the original org; and a scanner casing 15 in which all the structural components are disposed.

The present invention relates to the CCD sensor 9 and control board 11.

The operation of the image input apparatus is described in brief with reference to FIG. 1.

Light radiated from the light source 1 passes through the original glass 13 and illuminates the original org. Distribution of light radiated from the light source 1 is not uniform, and non-uniformity in illuminance occurs on the original org. To solve the problem, reflective light from the reflector 2 is also radiated on the original org, thereby uniformizing light distribution on the original org.

The reflective light from the original org is reflected by the first mirror 3, second mirror 5 and third mirror 6. Light coming from the third mirror 6 passes through the converging lens 8 and is focused on the light receiving surface of the CCD sensor 9. The CCD sensor 9 is mounted on the CCD sensor board 10 and is controlled by a control signal input from the control board 11.

The original hold cover 14 serves to bring the to-be-read surface of the original org, which is placed on the original glass 13, into close contact with the original glass 13.

An analog signal that is output from the CCD sensor 9 includes a high-frequency distortion due to a conversion efficiency variance among photoelectric converters, and a low-frequency distortion due to an aberration resulting from the use of a reduction-type optical system that includes the converging lens 8. This requires data that is to be used as a reference for normalization correction. In the present embodiment, the reference data is image data that is obtained by reading the white reference plate 12.

Figure 2:
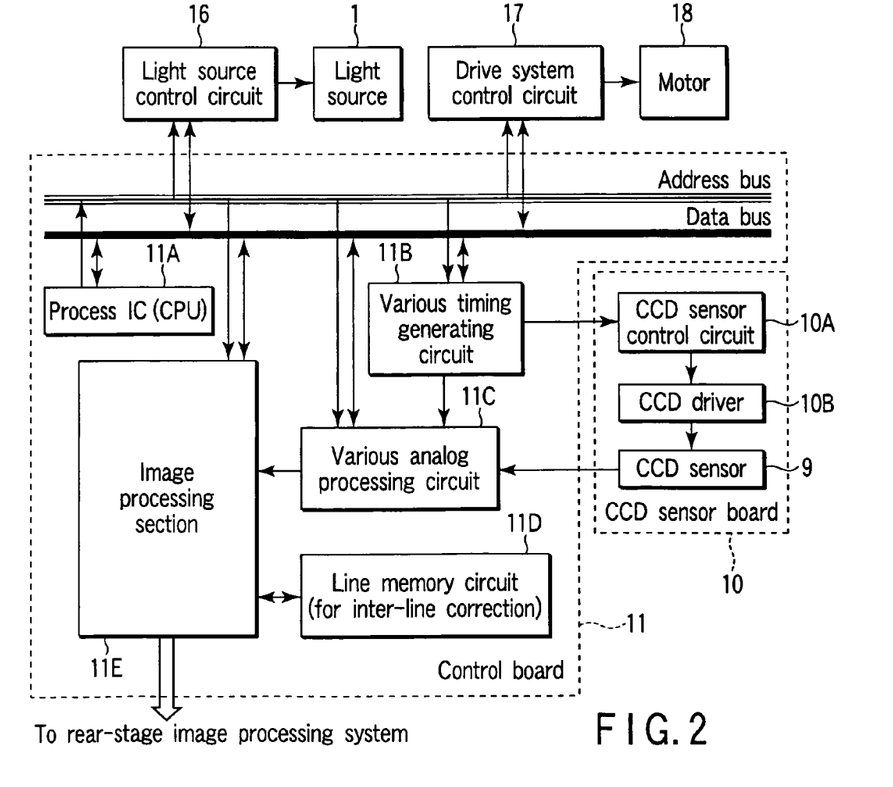
FIG. 2 schematically shows the structure of a control board.

FIG. 2 schematically shows the structure of the control board 11.

The control board 11 comprises a process IC (CPU) 11A, a various timing generating circuit 11B, a various analog processing circuit 11C, a line memory circuit 11D, and an image processing section 11E.

The process IC (CPU) 11 performs various processes.

The various timing generating circuit 11B generates various timings.

The various analog processing circuit 11C performs various processings that range from the processing of analog signals input from the CCD sensor 9 to the conversion of the analog signals to digital signals.

The image processing section 11E performs image correction such as shading correction for correcting high-frequency and low-frequency distortions in digital signals produced from the various analog processing circuit 11C, and inter-line correction for correcting an inter-line displacement between a plurality of line sensors.

The line memory circuit 11D delays image data in units of a line when the inter-line correction process is carried out.

The process IC (CPU) 11A controls a CCD sensor control circuit 10A that is mounted on the CCD sensor board 10, a light source control circuit 16 that controls light emission of the light source 1, and a drive system control circuit 17 that controls a motor 18 for driving the first carriage 4 and second carriage 7.

The CCD sensor board 10 comprises the CCD sensor 9, the CCD sensor control circuit 10A for driving the CCD sensor. 9, and a CCD driver 10B that receives an output from the CCD sensor control circuit 10A and generates proper driving conditions for the CCD sensor 9.

Figure 3:
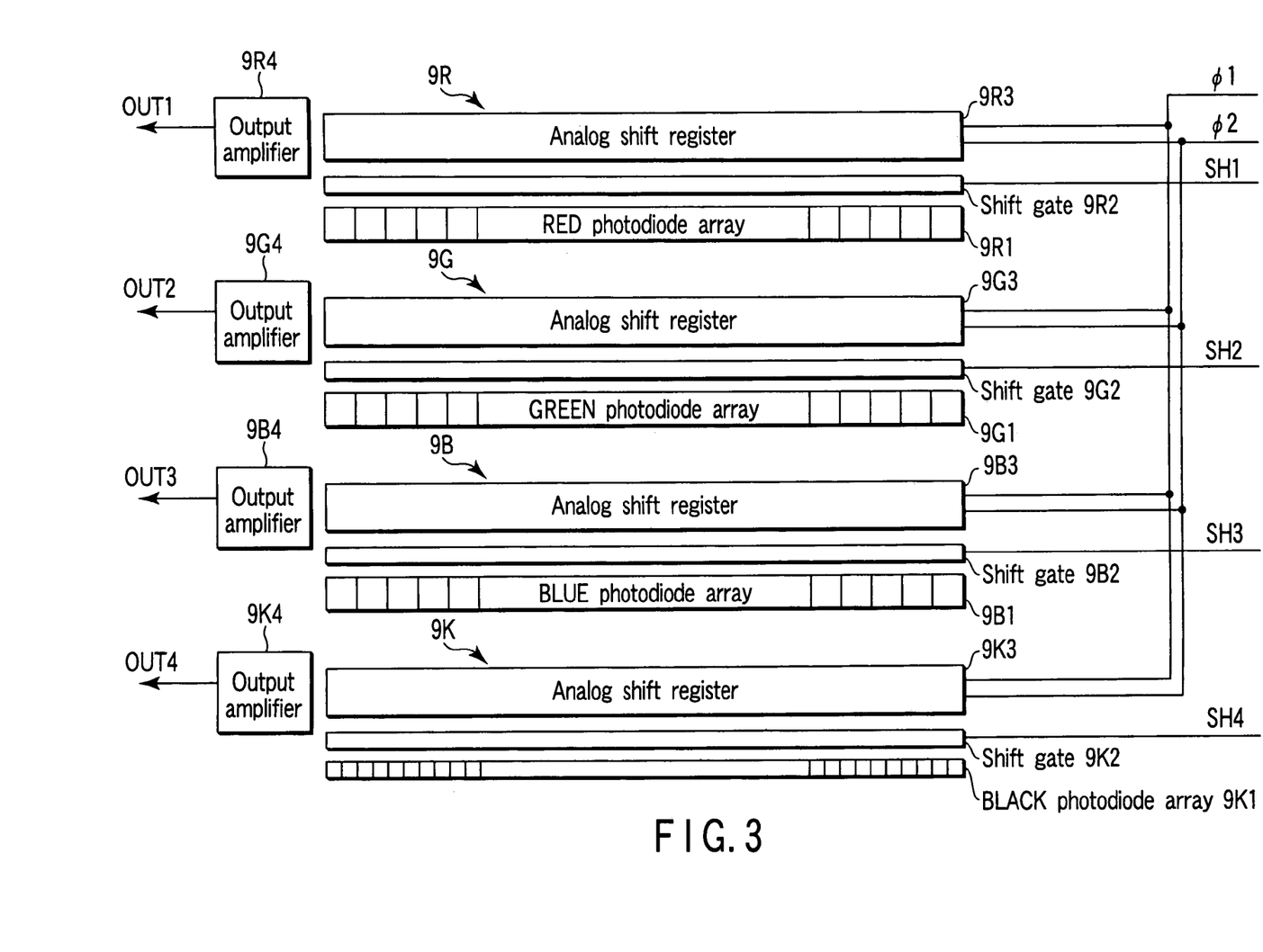
FIG. 3 schematically shows the structure of CCD line sensors.

FIG. 3 schematically shows the structure of the CCD sensor 9.

The CCD sensor 9 is a 4-line CCD sensor and comprises a RED line sensor 9R, a GREEN line sensor 9G, a BLUE line sensor 9B and a BLACK line sensor 9K.

The RED line sensor 9R comprises a RED photodiode array 9R1, a shift gate 9R2, an analog shift register 9R3, and an output amplifier 9R4. A RED color filter (not shown) is disposed on the light receiving surface of the RED photodiode array 9R1. The RED photodiode array 9R1 converts (photoelectric conversion) incident light to a charge corresponding to the amount of light, and accumulates the charge in the respective photodiodes. The accumulated charge is transferred to the analog shift register 9R3 via the shift gate 9R2 by a control signal SH1 that is applied to the shift gate 9R2. The charge that has been transferred to the analog shift register 9R3 is successively delivered to the rear-stage output amplifier 9R4 by control signals Φ1 and Φ2. The output amplifier 9R4 outputs the charge as an output signal OUT1.

The GREEN line sensor 9G comprises a GREEN photodiode array 9G1, a shift gate 9G2, an analog shift register 9G3, and an output amplifier 9G4. A GREEN color filter (not shown) is disposed on the light receiving surface of the GREEN photodiode array 9G1. The GREEN photodiode array 9G1 converts (photoelectric conversion) incident light to a charge corresponding to the amount of light, and accumulates the charge in the respective photodiodes. The accumulated charge is transferred to the analog shift register 9G3 via the shift gate 9G2 by a control signal SH2 that is applied to the shift gate 9G2. The charge that has been transferred to the analog shift register 9G3 is successively delivered to the rear-stage output amplifier 9G4 by control signals Φ1 and Φ2. The output amplifier 9G4 outputs the charge as an output signal OUT2.

The BLUE line sensor 9B comprises a BLUE photodiode array 9B1, a shift gate 9B2, an analog shift register 9B3, and an output amplifier 9B4. A BLUE color filter (not shown) is disposed on the light receiving surface of the BLUE photodiode array 9B1. The BLUE photodiode array 9B1 converts (photoelectric conversion) incident light to a charge corresponding to the amount of light, and accumulates the charge in the respective photodiodes. The accumulated charge is transferred to the analog shift register 9B3 via the shift gate 9B2 by a control signal SH3 that is applied to the shift gate 9B2. The charge that has been transferred to the analog shift register 9B3 is successively delivered to the rear-stage output amplifier 9B4 by control signals Φ1 and Φ2. The output amplifier 9B4 outputs the charge as an output signal OUT3.

The BLACK line sensor 9K comprises a BLACK photodiode array 9K1, a shift gate 9K2, an analog shift register 9K3, and an output amplifier 9K4. No color filter is disposed on the light receiving surface of the BLACK photodiode array 9K1. The BLACK photodiode array 9K1 converts (photoelectric conversion) incident light to a charge corresponding to the amount of light, and accumulates the charge in the respective photodiodes. The accumulated charge is transferred to the analog shift register 9K3 via the shift gate 9K2 by a control signal SH4 that is applied to the shift gate 9K2. The charge that has been transferred to the analog shift register 9K3 is successively delivered to the rear-stage output amplifier 9K4 by control signals Φ1 and Φ2. The output amplifier 9K4 outputs the charge as an output signal OUT4.

In the CCD sensor 9, the above-described photodiode arrays, shift gates, analog shift registers and output amplifiers are disposed at predetermined positions.

Figure 4:
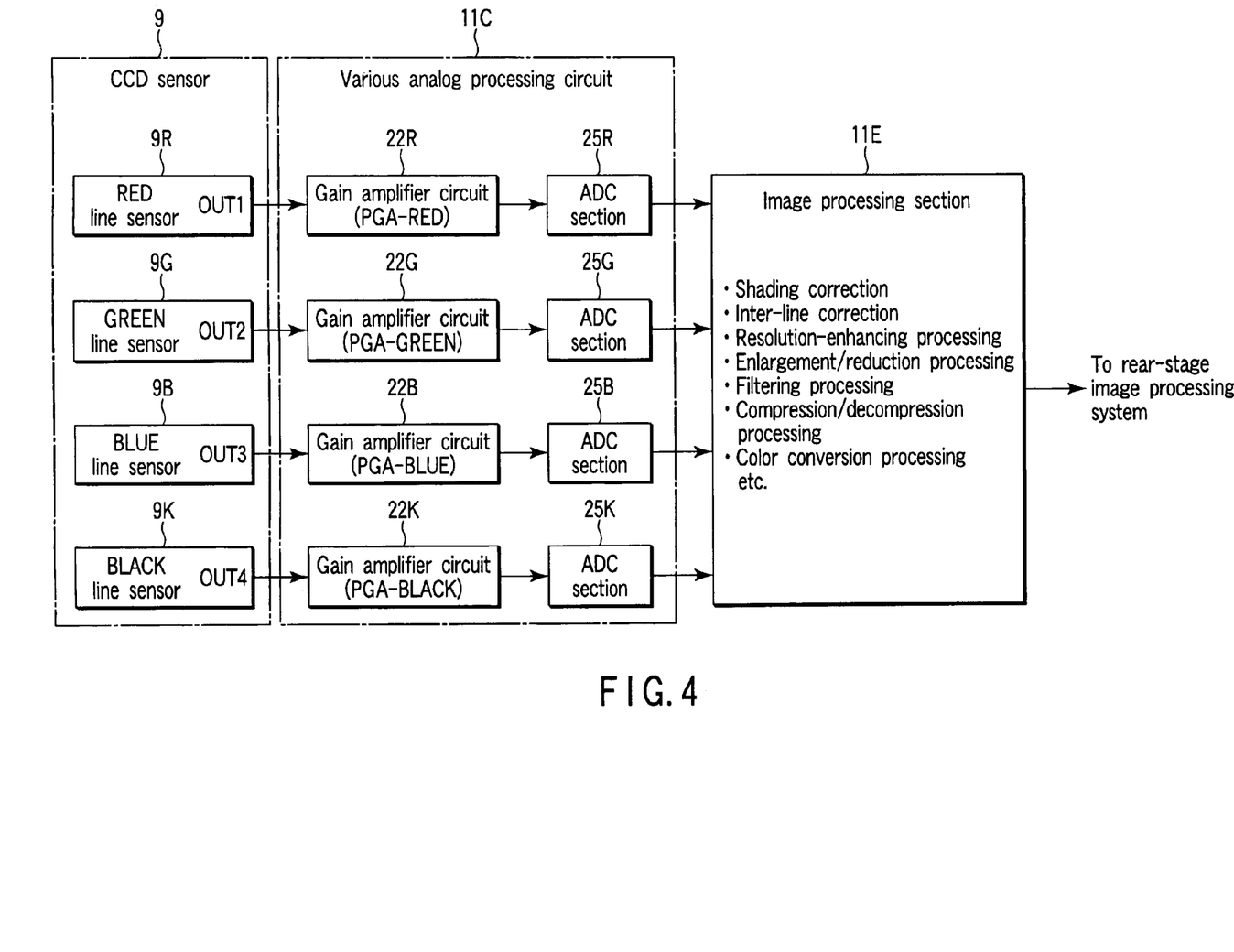
FIG. 4 illustrates processing performed successively by the CCD sensor, a various analog processing circuit and an image processing section.

FIG. 4 illustrates processing that is performed successively by the CCD sensor 9, the various analog processing circuit 11C and the image processing section 11E. In FIG. 4, depiction of the above-described structure of the various analog processing circuit 11C is partly omitted.

The output signal OUT1 from the RED line sensor 9R of the CCD sensor 9 is subjected to amplitude adjustment in a gain amplifier circuit (PGA-R) 22R. An ADC section 25R converts the amplitude-adjusted analog signal to a digital signal, and outputs the digital signal to the image processing section 11E.

Similarly, the output signal OUT2 from the GREEN line sensor 9G of the CCD sensor 9 is subjected to amplitude adjustment in a gain amplifier circuit (PGA-G) 22G. An ADC section 25G converts the amplitude-adjusted analog signal to a digital signal, and outputs the digital signal to the image processing section 11E.

Similarly, the output signal OUT3 from the BLUE line sensor 9B of the CCD sensor 9 is subjected to amplitude adjustment in a gain amplifier circuit (PGA-B) 22B. An ADC section 25B converts the amplitude-adjusted analog signal to a digital signal, and outputs the digital signal to the image processing section 11E.

Similarly, the output signal OUT4 from the BLACK line sensor 9K of the CCD sensor 9 is subjected to amplitude adjustment in a gain amplifier circuit (PGA-BLACK) 22K. An ADC section 25K converts the amplitude-adjusted analog signal to a digital signal, and outputs the digital signal to the image processing section 11E.

The image processing section 11E performs, for instance, shading correction, inter-line correction, and a process for correcting the RED, GREEN and BLUE output signals on the basis of the BLACK output signal. The processed signals are output to the rear-stage image processing system (engine section).

According to the present invention, in the 4-line CCD sensor that outputs RED, GREEN, BLUE and BLACK signals, the image processing section 11E shown in FIG. 4 performs an image process for correcting the RED, GREEN and BLUE output signals by using the BLACK output signal, thereby producing corrected RED, GREEN and BLUE signals.

Next, a first embodiment of the invention with the above-described structure will be described.

The first embodiment is associated with a process in a case where the resolution of each of the output signals from the RED line sensor 9R, GREEN line sensor 9G and BLUE line sensor 9B differs from the resolution of the output signal from the BLACK line sensor 9K.

Figure 5:
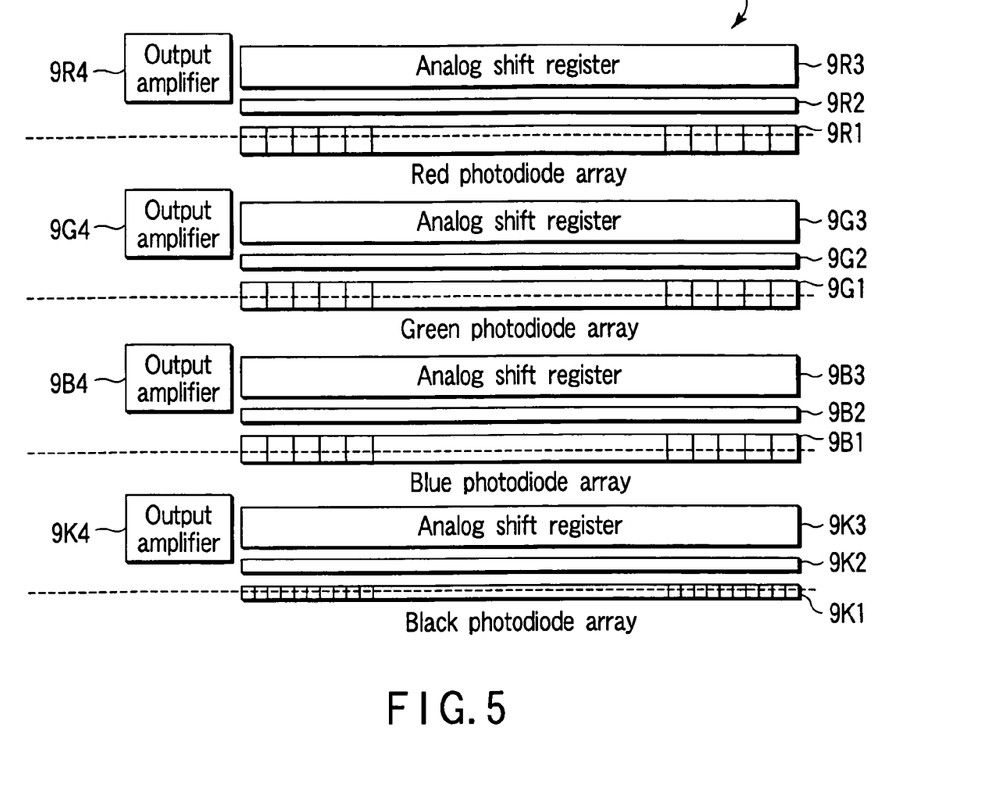
FIG. 5 shows an example of arrangement of the CCD sensor.

FIG. 5 shows an example of arrangement of the CCD sensor 9. In this example of arrangement, the RED photodiode array 9R1 is disposed as a first array in the original scan direction. Next, the GREEN photodiode array 9G1 is disposed. Then, the BLUE photodiode array 9B1 is disposed. At last, the BLACK photodiode array 9K1 is disposed.

The size of each photodiode (hereinafter referred to as "pixel size") in each of the RED photodiode array 9R1, GREEN photodiode array 9G1 and BLUE photodiode array 9B1 is larger than the pixel size of the BLACK photodiode array 9K1. Accordingly, the number of pixels in each of the RED photodiode array 9R1, GREEN photodiode array 9G1 and BLUE photodiode array 9B1 is less than the number of pixels in the BLACK photodiode array 9K1.

Figure 6:
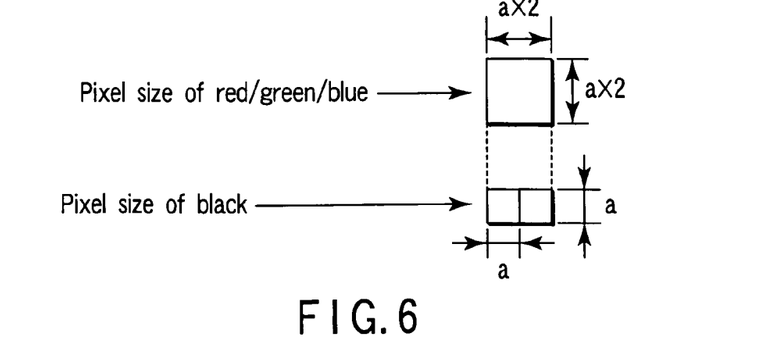
FIG. 6 is a view for explaining the pixel size of each line sensor.

In the first embodiment, as shown in FIG. 6, the pixel size of the BLACK photodiode array is set at a×a, and the pixel size of each of the RED photodiode array 9R1, GREEN photodiode array 9G1 and BLUE photodiode array 9B1 is set at (a×2)×(a×2).

Since each photodiode array has the same longitudinal length, the number of pixels of each of the RED photodiode array 9R1, GREEN photodiode array 9G1 and BLUE photodiode array 9B1 is half the number of pixels of the BLACK photodiode array 9K1.

When an A4-size paper sheet with a longitudinal length of 297 mm is read with a resolution of 600 dpi, the number of pixels that is required is 600 dpi/25.4 mm×297 mm=7015.7. Thus, the BLACK photodiode array 9K1 needs to have at least 7016 pixels.

If an error in attachment of the CCD sensor 9 or an error in placing the original org is taken into account, the BLACK photodiode array 9K1 needs to have (7016+α) pixels. Assume that the number of pixels of the BLACK photodiode array 9K1 is 7500.

In this case, the number of pixels in each of the RED photodiode array 9R1, GREEN photodiode array 9G1 and BLUE photodiode array 9B1 is 3750 (½ of 7500).

When an image is read by using the CCD sensor 9 of the first embodiment, the resolution of each of the output signals from the RED photodiode array 9R1, GREEN photodiode array 9G1 and BLUE photodiode array 9B1 is lower than the resolution of the output signal from the BLACK photodiode array 9K1.

In this case, in the first embodiment, the output signals from the RED photodiode array 9R1, GREEN photodiode array 9G1 and BLUE photodiode array 9B1 are corrected on the basis of the output signal from the BLACK photodiode array 9K1 (hereinafter referred to as "resolution-enhancing process"). The resolution-enhancing process is carried out to produce RED, GREEN and BLUE signals each having a resolution substantially equal to the resolution of the output signal from the BLACK photodiode array 9K1.

Next, image processes including the resolution-enhancing process in the image processing section 11E of the first embodiment are described.

Figure 7:
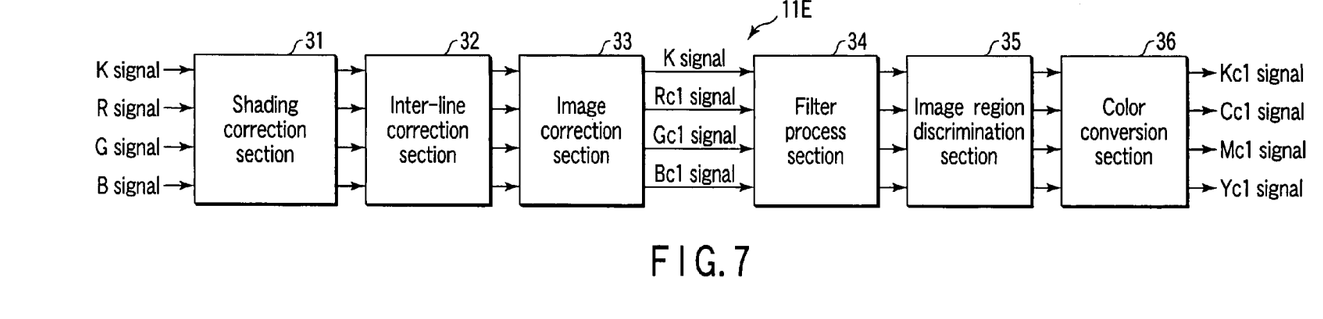
FIG. 7 is a block diagram schematically showing the structure of an image processing section in a first embodiment of the invention.

FIG. 7 schematically shows the structure of the image processing section 11E. The image processing section 11E comprises a shading correction section 31, an inter-line correction section 32, an image correction section 33, a filter process section 34, an image region discrimination section 35 and a color conversion section 36.

Assume that an output signal from the BLACK photodiode array 9K1 is a K signal, an output signal from the RED photodiode array 9R1 is an R signal, an output signal from the GREEN photodiode array 9G1 is a G signal, and an output signal from the BLUE photodiode array 9B1 is a B signal.

The K signal, R signal, G signal and B signal are subjected to shading correction in the shading correction section 31. The shading-corrected signals are subjected to inter-line correction for positioning in the inter-line correction section 32. The K signal, R signal, G signal and B signal, which have been subjected to inter-line correction, are input to the image correction section 33.

Using the input K signal, the image correction section 33 subjects the R signal, G signal and B signal to the resolution-enhancing process. The image correction section 33 outputs four signals: an Rc1 signal, a Gc1 signal and a Bc1 signal, which are produced by the resolution-enhancing process, and the K signal that is used for the resolution-enhancing process.

The resolution-enhancing process in the image correction section 33 is described in greater detail.

The pixel size of RED, GREEN and BLUE is double the pixel size of BLACK. Thus, if the K signal that is input to the image correction section 33 comprises components K01, K02, K03 and K04, the R signal comprises components R01 and R02, the G signal comprises components G01 and G02, and the B signal comprises components B01 and B02.

Figure 8:
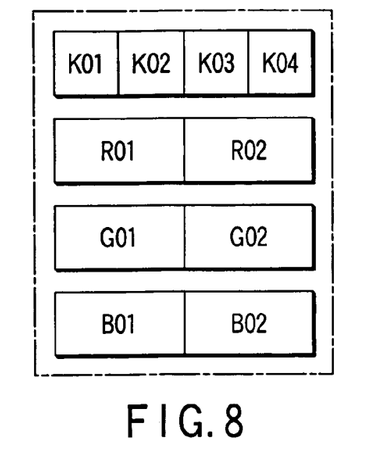
FIG. 8 shows structures of respective signals that are input to an image correction section.

FIG. 8 shows the configuration of the K signal (K01, K02, K03, K04), the R signal (R01, R02), the G signal (G01, G02) and the B signal (B01, B02).

Figure 9:
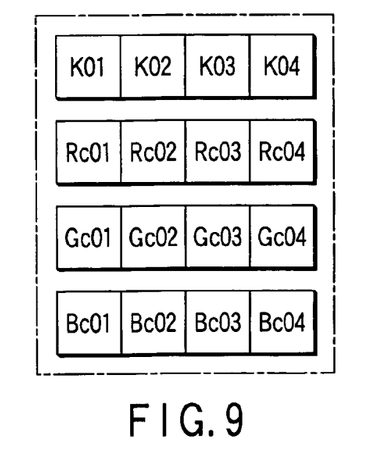
FIG. 9 shows structures of respective signals that are subjected to a resolution-enhancing process in the image correction section and are output.

The image correction section 33 subjects the R signal to the resolution-enhancing process so that it may have a pixel size that is equal to the pixel size of the K signal (BLACK). Thus, the image correction section 33 outputs a RED correction signal comprising Rc01, Rc02, Rc03 and Rc04. Similarly, the image correction section 33 subjects the G signal to the resolution-enhancing process and outputs a GREEN correction signal comprising Gc01, Gc02, Gc03 and Gc04. The image correction section 33 subjects the B signal to the resolution-enhancing process and outputs a BLUE correction signal comprising Bc01, Bc02, Bc03 and Bc04. In addition, the image correction section 33 outputs K01, K02, K03 and K04 of the K signal, which have been used for the resolution-enhancing process.

FIG. 9 shows the configuration of the K signal (K01, K02, K03, K04), the R signal (Rc01, Rc02, Rc03, Rc04), the G signal (Gc01, Gc02, Gc03, Gc04) and the B signal (Bc01, Bc02, Bc03, Bc04), which are produced by the resolution-enhancing process in the image correction section 33.

In FIG. 7, these four signals are output from the image correction section 33 as the K signal, Rc1 signal, Gc1 signal and Bc1 signal.

The K signal, Rc1 signal Gc1 signal and Bc1 signal are successively subjected to a filter process in the filter process section 34, an image region discrimination process in the image region discrimination section 35, and a color conversion process in the color conversion section 36.

In the image process section 11E, a Kc1 signal, a Cc1 signal (CYAN), an Mc1 signal (MAGENTA) and a Yc1 signal (YELLOW), which are output from the color conversion section 36, are delivered to the rear-stage image processing system.

Figure 10:
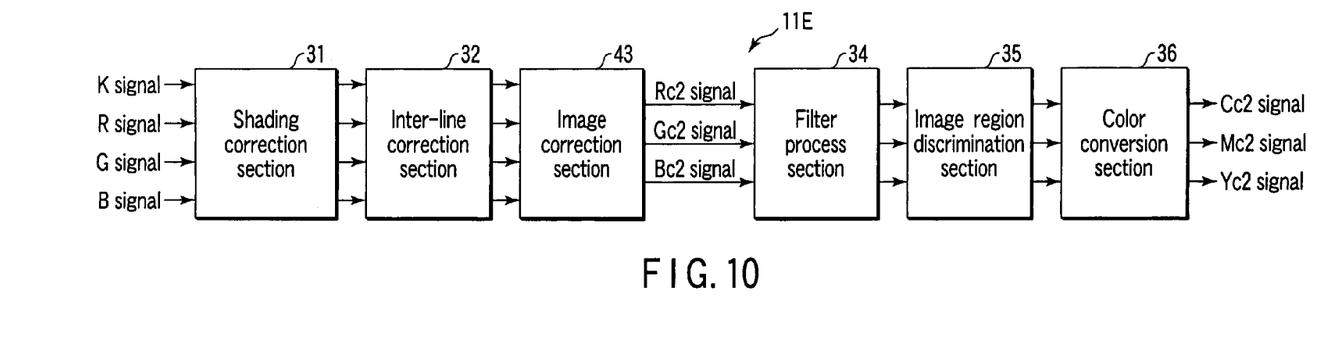
FIG. 10 is a block diagram schematically showing the structure of an image processing section in a modification of the first embodiment of the invention.

FIG. 10 schematically shows the structure of an image processing section 11E according to a modification of the first embodiment shown in FIG. 7. The image processing section 11E comprises a shading correction section 31, an inter-line correction section 32, an image correction section 43, a filter process section 34, an image region discrimination section 35 and a color conversion section 36. The parts common to those in the first embodiment are denoted by like reference numerals, and a description thereof is omitted.

The K signal, R signal, G signal and B signal are subjected to shading correction in the shading correction section 31. The shading-corrected signals are subjected to inter-line correction for positioning in the inter-line correction section 32. The K signal, R signal, G signal and B signal, which have been subjected to inter-line correction, are input to the image correction section 43.

Using the input K signal, the image correction section 43 subjects the R signal, G signal and B signal to the resolution-enhancing process. The image correction section 43 outputs an Rc2 signal, a Gc2 signal and a Bc2 signal, which are produced by the resolution-enhancing process.

The resolution-enhancing process in the image correction section 43 is described in greater detail.

The pixel size of RED, GREEN and BLUE is double the pixel size of BLACK. Thus, if the K signal that is input to the image correction section 43 comprises components K01, K02, K03 and K04, the R signal comprises components R01 and R02, the G signal comprises components G01 and G02, and the B signal comprises components B01 and B02. This is the same as in the structure shown in FIG. 8.

Figure 11:
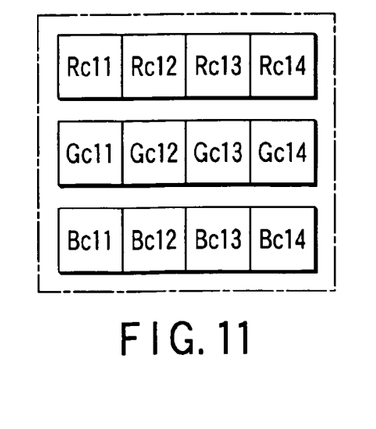
FIG. 11 shows structures of respective signals that are subjected to a resolution-enhancing process in the image correction section and are output.

The image correction section 43 subjects the R signal to the resolution-enhancing process so that it may have a pixel size that is equal to the pixel size of the K signal (BLACK). Thus, the image correction section 43 outputs a RED correction signal comprising Rc11, Rc12, Rc13 and Rc14. Similarly, the image correction section 43 subjects the G signal to the resolution-enhancing process and outputs a GREEN correction signal comprising Gc11, Gc12, Gc13 and Gc14. The image correction section 43 subjects the B signal to the resolution-enhancing process and outputs a RED correction signal comprising Bc11, Bc12, Bc13 and Bc14.

FIG. 11 shows the configuration of the R signal (Rc11, Rc12, Rc13, Rc14), the G signal (Gc11, Gc12, Gc13, Gc14) and the B signal (Bc11, Bc12, Bc13, Bc14), which are produced by the resolution-enhancing process in the image correction section 43.

In FIG. 10, these three signals are output from the image correction section 43 as the Rc2 signal, Gc2 signal and Bc2 signal.

The Rc2 signal Gc2 signal and Bc2 signal are successively subjected to a filter process in the filter process section 34, an image region discrimination process in the image region discrimination section 35, and a color conversion process in the color conversion section 36.

In the image process section 11E, a Cc2 signal (CYAN), an Mc2 signal (MAGENTA) and a Yc2 signal (YELLOW), which are output from the color conversion section 36, are delivered to the rear-stage image processing system.

The details of the resolution-enhancing process are described below.

In an example of the resolution-enhancing process, RED, GREEN and BLUE output signals are corrected with reference to a high-resolution BLACK output signal.

Figure 12:
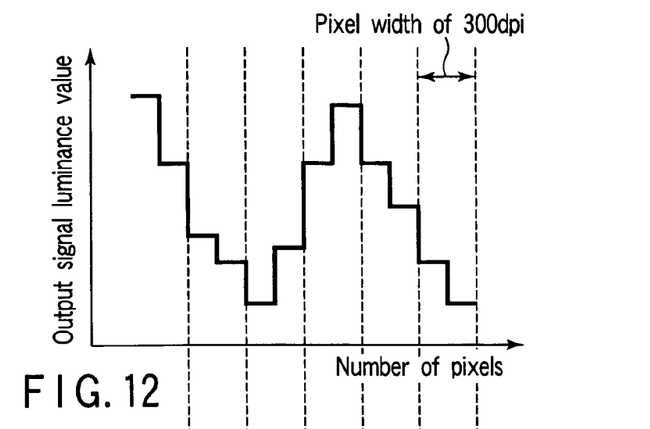
FIG. 12 shows a high-resolution BLACK output signal.

FIG. 12 shows a high-resolution BLACK output signal.

Figure 13:
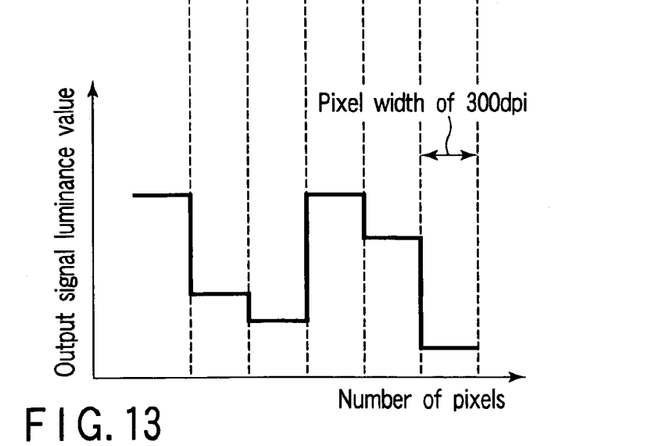
FIG. 13 shows an example of a low-resolution color output signal, which is read at the same time as the high-resolution BLACK signal.

FIG. 13 shows an example of a low-resolution color output signal, which is read at the same time as the high-resolution BLACK signal shown in FIG. 12.

The ordinate indicates an output signal luminance value, and the abscissa indicates the number of pixels. Broken lines indicate division lines in units of 300 dpi. If the reading by a high-resolution sensor and the reading by a low-resolution sensor are compared, it is understood that high-luminance portions and low-luminance portions of the output signal are rounded in the case of the low-resolution reading. In the resolution-enhancing process, the above two output signals are used to obtain a high-resolution color signal.

Figure 14:
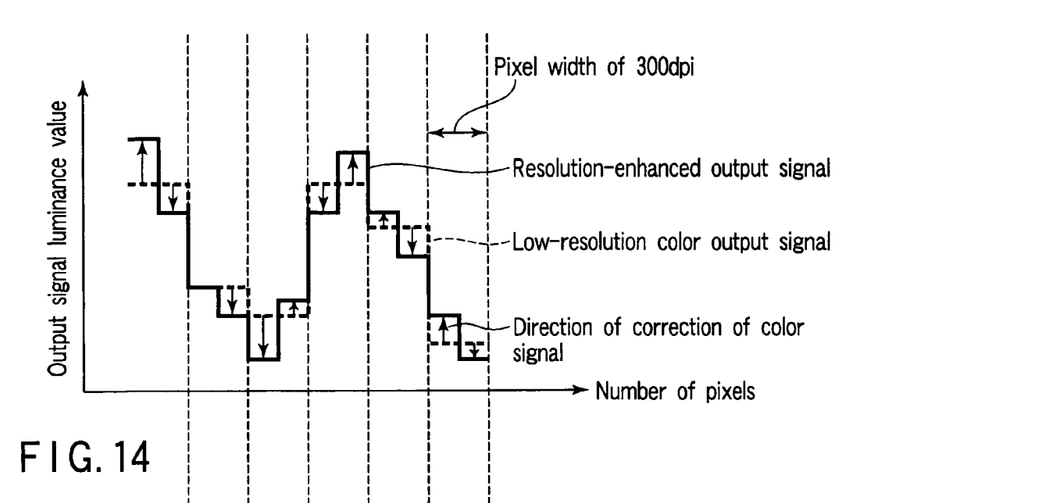
FIG. 14 illustrates an example of the resolution-enhancing process.

FIG. 14 illustrates an example of the resolution-enhancing process. The ordinate indicates an output signal luminance value, and the abscissa indicates the number of pixels. Broken lines indicate division lines in units of 300 dpi. A thick solid line indicates an output signal after the resolution-enhancing process, and a thick broken line indicates an input low-resolution color signal. Arrows indicate directions of correction.

The high-resolution BLACK signal and low-resolution color signal are superimposed on each other referring to the BLACK output signal, the low-resolution signal is corrected so as to conform to the BLACK signal. By carrying out this resolution-enhancing process, a high-resolution color image can be obtained.

Figure 15:
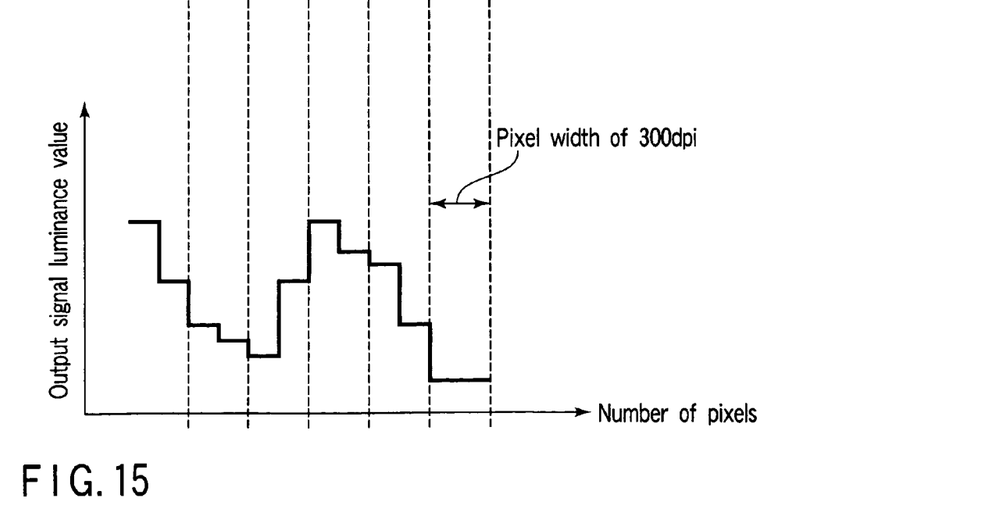
FIG. 15 shows an example in which the resolution of the low-resolution color signal is enhanced by simple linear interpolation.

FIG. 15 shows an example in which the resolution of the low-resolution color signal shown in FIG. 13 is enhanced by simple linear interpolation. If FIG. 14 and FIG. 15 are compared, it is understood that in FIG. 14 high-luminance portions and low-luminance portions of the output signal are clearly reproduced.

As illustrated in the first embodiment and the modification thereof, each of the low-resolution RED, GREEN and BLUE output signals can be made to conform to the resolution of the BLACK output signal by the above-described resolution-enhancing process. Thus, high-resolution RED, GREEN and BLUE correction signals are obtained.

A second embodiment of the present invention will now be described.

The second embodiment is associated with a process in a case where the resolution of each of the output signals from the RED, GREEN and BLUE sensors is equal to the resolution of the output signal from the BLACK sensor.

Figure 16:
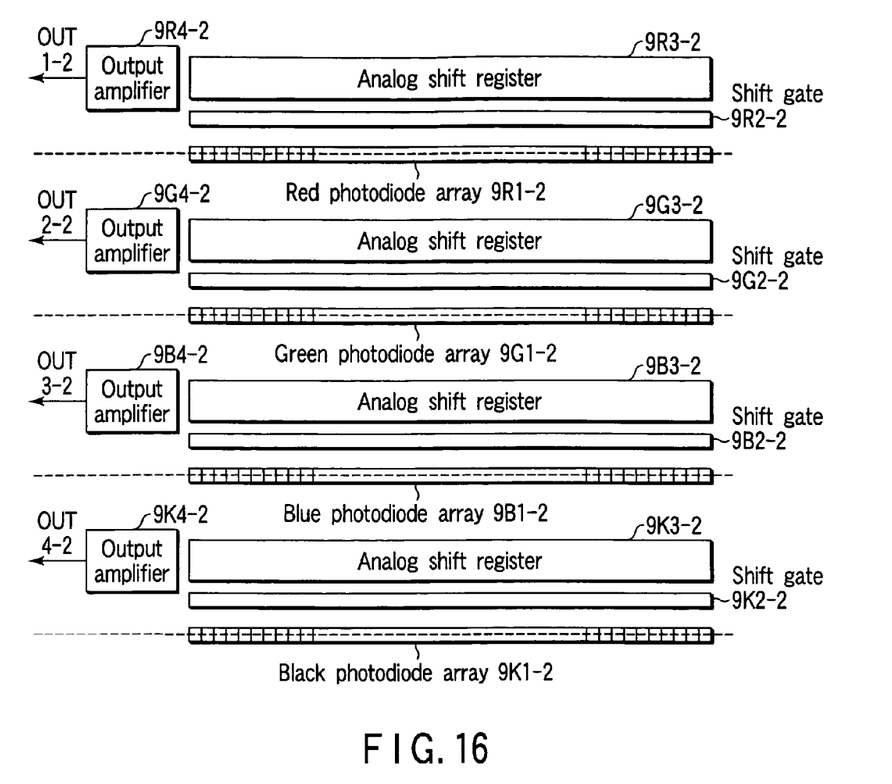
FIG. 16 shows an example of arrangement of a CCD sensor according to a second embodiment of the invention.

FIG. 16 shows an example of arrangement of the CCD sensor 9 according to the second embodiment. In this example of arrangement, a RED photodiode array 9R1-2 is disposed as a first array in the original scan direction. A GREEN photodiode array 9G1-2 is then disposed. Subsequently, a BLUE photodiode array 9B1-2 is disposed. At last, a BLACK photodiode array 9K1-2 is disposed.

The size of each photodiode (hereinafter referred to as "pixel size") in each of the RED photodiode array 9R1-2, GREEN photodiode array 9G1-2 and BLUE photodiode array 9B1-2 is equal to the pixel size of the BLACK photodiode array 9K1-2.

Figure 17:
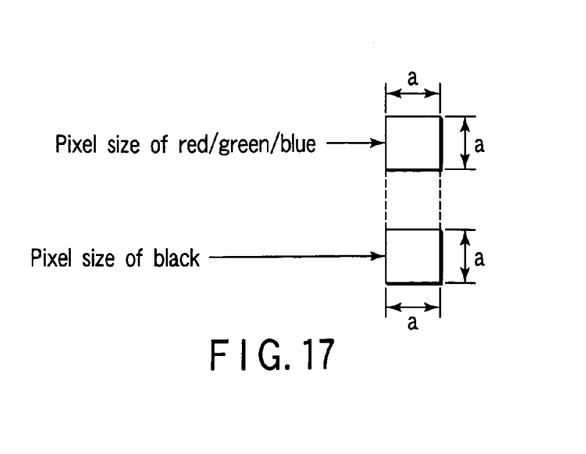
FIG. 17 is a view for explaining the pixel size of each line sensor.

In the second embodiment, as shown in FIG. 17, the pixel size of the BLACK photodiode array 9K1-2 is set at a×a, and the pixel size of each of the. RED photodiode array 9R1-2, GREEN photodiode array 9G1-2 and BLUE photodiode array 9B1-2 is set at a×a. Since each photodiode array has the same longitudinal length, the number of pixels of each of the RED photodiode array 9R1-2, GREEN photodiode array 9G1-2 and BLUE photodiode array 9B1-2 is equal to the number of pixels of the BLACK photodiode array 9K1-2.

When an A4-size paper sheet with a longitudinal length of 297 mm is read with a resolution of 600 dpi, the number of pixels that is required is 600 dpi/25.4 mm×297 mm=7015.7. Thus, the BLACK photodiode array 9K1-2 needs to have at least 7016 pixels.

If an error in attachment of the CCD sensor 9 or an error in placing the original org is taken into account, the BLACK photodiode array 9K1-2 needs to have (7016+α) pixels. Assume that the number of pixels of the BLACK photodiode array 9K1-2 is 7500.

In this case, the number of pixels in each of the RED photodiode array 9R1-2, GREEN photodiode array 9G1-2 and BLUE photodiode array 9B1-2 is 7500, which is equal to the number of pixels in the BLACK photodiode array 9K1-2.

When an image is read by using the CCD sensor 9 of the second embodiment, the output signals from the RED photodiode array 9R1-2, GREEN photodiode array 9G1-2, BLUE photodiode array 9B1-2 and the BLACK photodiode array 9K1-2 have the same resolution.

In this case, in the second embodiment, a black character substitution process is performed for the output signals from the RED photodiode array 9R1-2, GREEN photodiode array 9G1-2 and BLUE photodiode array 9B1-2 on the basis of the output signal from the BLACK photodiode array 9K1-2. The details of the black character substitution process will be described later.

Next, image processes including the correction process in the image processing section 11E of the second embodiment are described.

Figure 18:
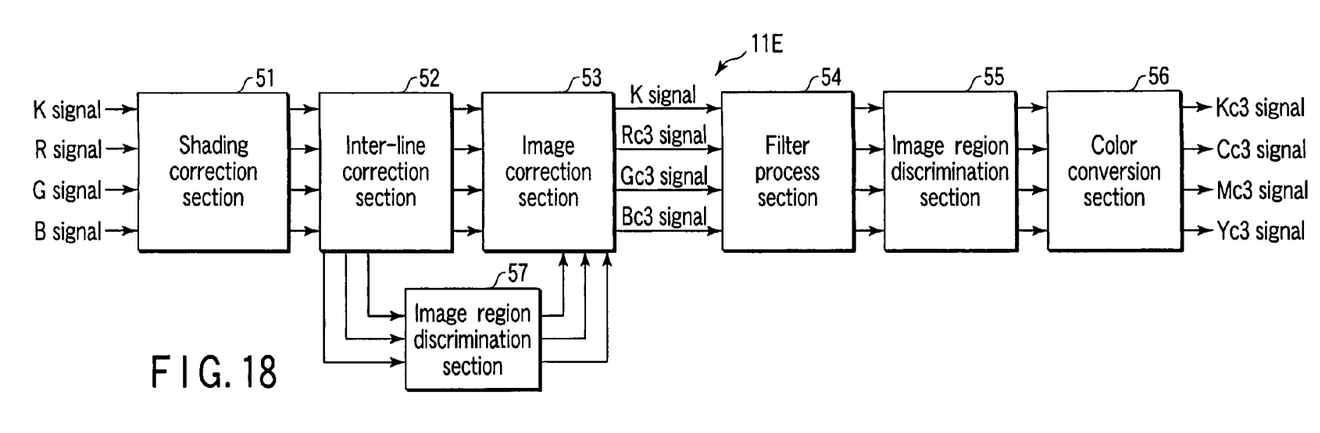
FIG. 18 is a block diagram schematically showing the structure of an image processing section in the second embodiment of the invention.

FIG. 18 schematically shows the structure of the image processing section 11E according to the second embodiment. The image processing section 11E comprises a shading correction section 51, an inter-line correction section 52, an image correction section 53, a filter process section 54, an image region discrimination section 55, a color conversion section 56, and an image region discrimination section 57.

Assume that an output signal from the BLACK photodiode array 9K1-2 is a K signal, an output signal from the RED photodiode array 9R1-2 is an R signal, an output signal from the GREEN photodiode array 9G1-2 is a G signal, and an output signal from the BLUE photodiode array 9B1-2 is a B signal.

The K signal, R signal, G signal and B signal are subjected to shading correction in the shading correction section 51. The shading-corrected:signals are subjected to inter-line correction for positioning in the inter-line correction section 52. The K signal, R signal, G signal and B signal, which have been subjected to inter-line correction, are input to the image correction section 53. At the same time, the R signal, G signal and B signal are input to the image region discrimination section 57.

The image region discrimination section 57 determines (discriminates) the position of a black part, such as a black character or a black line, on the basis of the input R signal, G signal and B signal, and delivers the discrimination information to the image correction section 53.

Based on the information from the image region discrimination section 57, the image correction section 53 performs the black character substitution process for the R signal, G signal and B signal by using the K signal. The image correction section 53 outputs four signals: an Rc3 signal, a Gc3 signal and a Bc3 signal, which have been subjected to the black character substitution process, and the K signal that has been used for the black character substitution process.

The pixel size of RED, GREEN and BLUE is equal. Thus, if the K signal that is input to the image correction section 53 comprises components K21, K22, K23 and K24, the R signal comprises components R21, R22, R23 and R24, the G signal comprises components G21, G22, G23 and G24, and the B signal comprises components B21, B22, B23 and B24.

Figure 19:
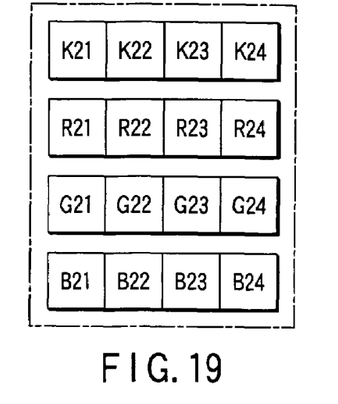
FIG. 19 shows structures of respective signals that are input to an image correction section.

FIG. 19 shows the configuration of the K signal (K21, K22, K23 and K24), the R signal (R21, R22, R23 and R24), the G signal (G21, G22, G23 and G24) and the B signal (B21, B22, B23 and B24).

Figure 20:
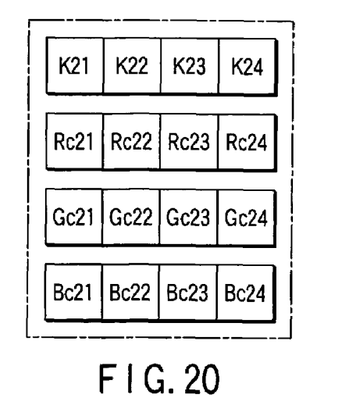
FIG. 20 shows structures of respective signals that are subjected to a correction process in the image correction section and are output.

The image correction section 53 subjects the R signal, G signal and B signal to the black character substitution process by using K21, K22, K23 and K24 of the K signal, on the basis of the information from the image region discrimination section 57. Thus, the image correction section 53 outputs a RED correction signal comprising Rc21, Rc22, Rc23 and Rc24, a GREEN correction signal comprising Gc21, Gc22, Gc23 and Gc24, a BLUE correction signal comprising Bc21, Bc22, Bc23 and Bc24. Each of the RED correction signal, GREEN correction signal and BLUE correction signal has the same pixel size as the K signal. In addition, the image correction section 53 outputs K21, K22, K23 and K24 of the K signal, which have been used for the correction process.

FIG. 20 shows the configuration of the K signal (K21, K22, K23, K24), the R signal (Rc21, Rc22, Rc23, Rc24), the G signal (Gc21, Gc22, Gc23, Gc24) and the B signal (Bc21, Bc22, Bc23, Bc24), which are produced by the correction process in the image correction section 53.

In FIG. 18, these four signals are output as the K signal, Rc3 signal, Gc3 signal and Bc3 signal.

The K signal, Rc3 signal Gc3 signal and Bc3 signal are successively subjected to a filter process in the filter process section 54, an image region discrimination process in the image region discrimination section 55, and a color conversion process in the color conversion section 56.

In the image process section 11E, a Kc3 signal, a Cc3 signal (CYAN), an Mc3 signal (MAGENTA) and a Yc3 signal (YELLOW), which are output from the color conversion section 56, are delivered to the rear-stage image processing system.

Figure 21:
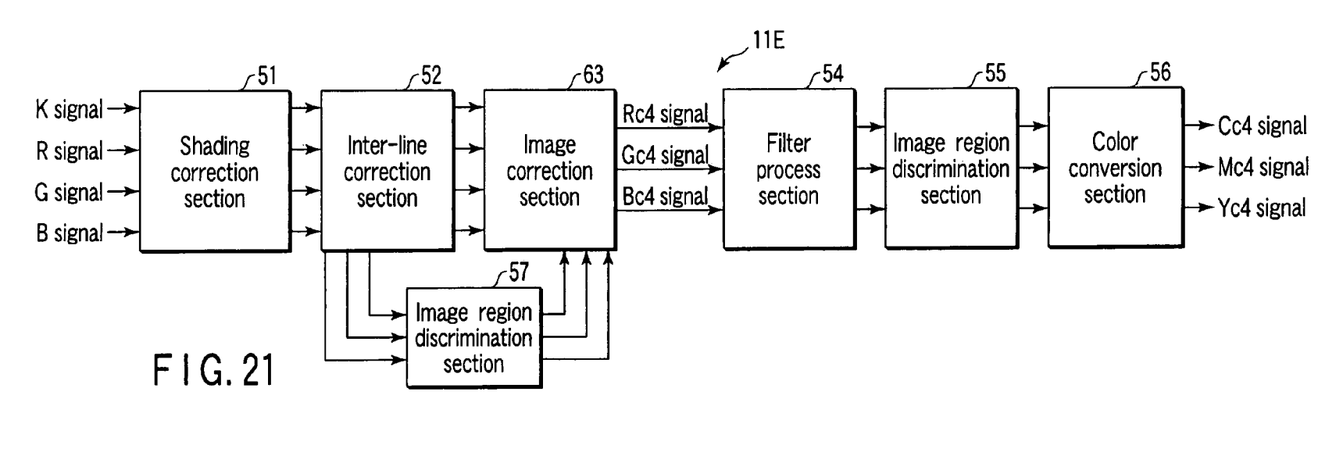
FIG. 21 is a block diagram schematically showing the structure of an image processing section in a modification of the second embodiment of the invention.

FIG. 21 schematically shows the structure of an image processing section 11E according to a modification of the second embodiment shown in FIG. 18. The image processing section 11E according to the modification of the second embodiment comprises a shading correction section 51, an inter-line correction section 52, an image correction section 63, a filter process section 54, an image region discrimination section 55, a color conversion section 56 and an image region discrimination section 57. The parts common to those in the second embodiment are denoted by like reference numerals, and a description thereof is omitted.

The K signal, R signal, G signal and B signal are subjected to shading correction in the shading correction section 51. The shading-corrected signals are subjected to inter-line correction for positioning in the inter-line correction section 52. In addition, the R signal, G signal and B signal are input to the image region discrimination section 57.

The image region discrimination section 57 discriminates the position of a black part, such as a black character or a black line, on the basis of the input R signal, G signal and B signal, and delivers the discrimination information to the image correction section 63.

Based on the information from the image region discrimination section 57, the image correction section 63 performs the black character substitution process for the R signal, G signal and B signal by using the K signal. The image correction section 63 outputs an Rc4 signal, a Gc4 signal and a Bc4 signal, which have been subjected to the black character substitution process.

The correction process in the image correction section 63 is described in greater detail.

The pixel size of RED, GREEN and BLUE is equal. Thus, if the K signal that is input to the image correction section 63 comprises components K21, K22, K23 and K24, the R signal comprises components R21, R22, R23 and R24, the G signal comprises components G21, G22, G23 and G24, and the B signal comprises components B21, B22, B23 and B24. This is the same as in the structure shown in FIG. 19.

Figure 22:
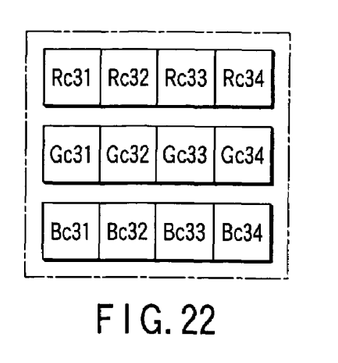
FIG. 22 shows structures of respective signals that are subjected to a correction process in the image correction section and are output.

The image correction section 63 subjects the R signal, G signal and B signal to the correction process by using K21, K22, K23 and K24 of the K signal, on the basis of the information from the image region discrimination section 57. Thus, the image correction section 63 outputs a RED correction signal comprising Rc31, Rc32, Rc33 and Rc34, a GREEN correction signal comprising Gc31, Gc32, Gc33 and Gc34, a BLUE correction signal comprising Bc31, Bc32, Bc33 and Bc34. Each of the RED correction signal, GREEN correction signal and BLUE correction signal has the same pixel size as the K signal.

FIG. 22 shows the configuration of the R signal (Rc31, Rc32, Rc33, Rc34), the G signal (Gc31, Gc32, Gc33, Gc34) and the B signal (Bc31, Bc32, Bc33, Bc34), which are produced by the correction process in the image correction section 63.

In FIG. 21, these three signals are output from the image correction section 63 as the Rc4 signal, Gc4 signal and Bc4 signal.

The Rc4 signal Gc4 signal and Bc4 signal are successively subjected to a filter process in the filter process section 54, an image region discrimination process in the image region discrimination section 55, and a color conversion process in the color conversion section 56.

In the image process section 11E, a Cc4 signal (CYAN), an Mc4 signal (MAGENTA) and a Yc4 signal (YELLOW), which are output from the color conversion section 56, are delivered to the rear-stage image processing system.

The details of the black character substitution are described below.

In the prior-art 3-line sensor that outputs RED, GREEN and BLUE signals, when a black character is read, the black character is expressed by overlapping three colors. In this case, color misregistration may occur due to aberration of the lens or non-uniformity in rotation of the motor. Because of a failure in color overlapping, a black character with a uniform density may not be read with a uniform density, resulting in a non-uniform output signal. Further, color overlapping becomes more difficult, for example, when the magnification for reading is changed.

In the image processing according to the second embodiment, an image region discrimination is performed based on the RED, GREEN and BLUE output signals. If a black character is determined, the BLACK output signal is substituted for the RED, GREEN and BLUE output signals.

When a black character is read by the BLACK sensor, only one output is obtained. Hence, no color misregistration occurs due to aberration of the lens or non-uniformity in rotation of the motor. It is less possible that the output signal value varies when the black character with the same density is read. By executing this process, it becomes possible to decrease the non-uniformity in density of the black character or in line width, which results from aberration of the lens or non-uniform rotation of the motor.

Figure 23:
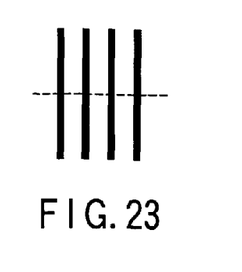
FIG. 23 shows an example in which black lines with the same density and thickness are arranged.
Figure 24:
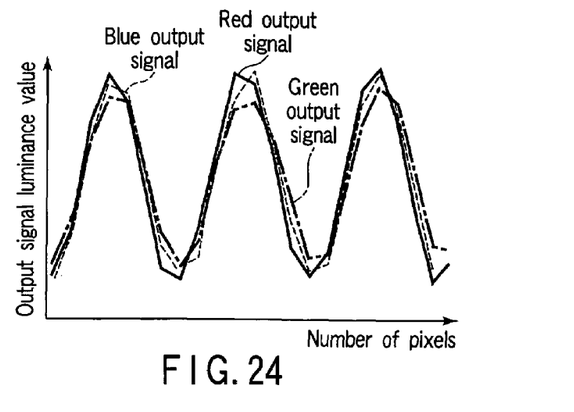
FIG. 24 shows an example of color output signals in a case where luminance values are calculated.

FIG. 24 shows an example of color output signals that are obtained when luminance values of a region including black lines with the same density and thickness, which are arranged as shown in FIG. 23, are calculated in a direction indicated by a broken line in FIG. 23.

Figure 25:
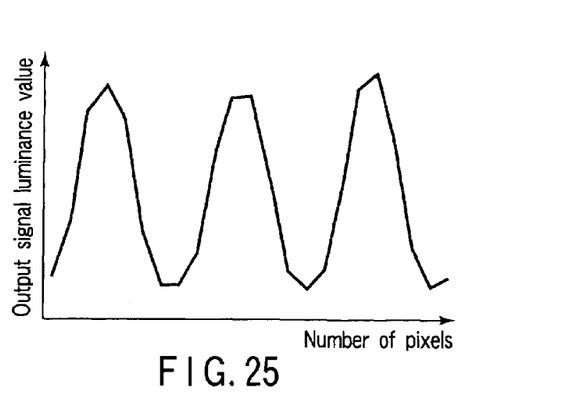
FIG. 25 shows a BLACK output signal at the same position as in the example of the color output signals.

FIG. 25 shows a BLACK output signal at the same position as in the example of the color output signals shown in FIG. 23.

In FIG. 24, the ordinate indicates an output signal luminance value, and the abscissa indicates the number of pixels. A solid line indicates a RED output signal, a dot-and-dash line indicates a GREEN output signal, and a broken line indicates a BLUE output signal. As is understood from FIG. 24, high-luminance portions and low-luminance portions appear with variations due to slight differences in sensitivity of sensors. If a black signal is produced from these color signals, it is possible that the density varies from line to line. Moreover, the line width that is represented by each output signal may vary due to non-uniform rotation of the motor or aberration of the lens. If a black signal is produced from these color signals, it is also possible that the line thickness varies from line to line.

By contrast, in the second embodiment, the black character substitution process is executed using a single-color line (BLACK output signal) as shown in FIG. 25. It is thus possible to reduce the non-uniformity in density or line width.

As has been described above, according to the embodiments of the present invention, there is provided an image input apparatus that has a plurality of lines sensors, which have different numbers of, or the same number of, pixels, and synthesizes output signals of the line sensors, thereby to form image information. Using the output signal of the line sensor having no color filter on its light receiving surface, the output of the line sensor having a color filter on its light receiving surface is corrected. Thereby, the following advantages are obtained.

In a case where the number of pixels of the line sensor having the color filter on its light receiving surface is less than the number of pixels of the line sensor having no color filter on its light receiving surface, a BLACK output signal with a larger number of pixels is used to perform a resolution conversion process for RED, GREEN and BLUE output signals with less numbers of pixels. Thereby, a high image quality is obtained.

In a case where the number of pixels of the line sensor having the color filter on its light receiving surface is equal to the number of pixels of the line sensor having no color filter on its light receiving surface, image information that is obtained by synthesizing RED, GREEN and BLUE output signals is subjected to an image region discrimination process. If the image information is determined to be a black character or a black part, a BLACK output signal is substituted. Thereby, it becomes possible to reduce non-uniformity in density of a black character or non-uniformity in line width associated with the RED, GREEN and BLUE output signals, which results from aberration in the black character or black part or non-uniform rotation of the motor. Thus, a high image quality can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image input apparatus comprising:
   means, including a first line sensor and a second line sensor, for converting an image of an original, the first line sensor being composed of a plurality of line sensors having different color filters on light receiving surfaces thereof and the second line sensor having no color filter on a light receiving surface thereof;
   means for discriminating an image region of each of output signals from the plurality of line sensors that constitute the first line sensor, and for outputting discrimination information; and
   means for correcting the output signals from the plurality of line sensors of the first line sensor of the converting means, on the basis of the discrimination information from the discriminating means, with reference to an output signal from the second line sensor of the converting means,
   wherein the correcting means performs correction by executing a black character substitution process for each of the output signals from the plurality of line sensors of the first line sensor, on the basis of the discrimination information from the discriminating means with reference to the output signal from the second line sensor.

2. An image input apparatus comprising:
   means, including a first line sensor and a second line sensor, for converting an image of an original, the first line sensor being composed of a plurality of line sensors having different color filters on light receiving surfaces thereof and the second line sensor having no color filter on a light receiving surface thereof;
   means for discriminating an image region of each of output signals from the plurality of line sensors that constitute the first line sensor, and for outputting discrimination information; and
   means for correcting the output signals from the plurality of line sensors of the first line sensor of the converting means, on the basis of the discrimination information from the discriminating means, with reference to an output signal from the second line sensor of the converting means,
   wherein the correcting means executes a black character substitution process for each of the output signals from the plurality of line sensors of the first line sensor, on the basis of the discrimination information from the discriminating means, with reference to the output signal from the second line sensor, and produces the output signals, which are subjected to the black character substitution process, and the output signal from the second line sensor.

3. An image input apparatus comprising:
means, including a first line sensor and a second line sensor, for converting an image of an original, the first line sensor being composed of a plurality of line sensors having different color filters on light receiving surfaces thereof and the second line sensor having no color filter on a light receiving surface thereof;
means for discriminating an image region of each of output signals from the plurality of line sensors that constitute the first line sensor, and for outputting discrimination information; and
means for correcting the output signals from the plurality of line sensors of the first line sensor of the converting means, on the basis of the discrimination information from the discriminating means, with reference to an output signal from the second line sensor of the converting means,
wherein the correcting means executes a black character substitution process for each of the output signals from the plurality of line sensors of the first line sensor, on the basis of the discrimination information from the discriminating means, with reference to the output signal from the second line sensor, and produces the output signals that are subjected to the black character substitution process.

4. An image input apparatus comprising:
a photoelectric conversion device, which includes a first sensor and a second sensor and is configured to convert an image of an original, the first sensor including a plurality of line sensors having different color filters on light receiving surfaces thereof and the second sensor having no color filter on a light receiving surface thereof;
an image region discrimination unit, which is configured to discriminate an image region of each of output signals from the plurality of line sensors of the first sensor of the photoelectric conversion device, and to output discrimination information; and
a correction unit, which is configured to correct the output signals from the plurality of line sensors of the first sensor of the photoelectric conversion device, on the basis of the discrimination information from the image region discrimination unit, with reference to an output signal from the second sensor of the photoelectric conversion device,
wherein the correction unit performs correction by executing a black character substitution process for each of the output signals from the plurality of line sensors of the first sensor on the basis of the discrimination information from the image region discrimination unit, and outputs the output signal from the second sensor.

5. An image input apparatus comprising:
a photoelectric conversion device, which includes a first sensor and a second sensor and is configured to convert an image of an original, the first sensor including a plurality of line sensors having different color filters on light receiving surfaces thereof and the second sensor having no color filter on a light receiving surface thereof;
an image region discrimination unit, which is configured to discriminate an image region of each of output signals from the plurality of sensors of the first sensor of the photoelectric conversion device, and to output discrimination information; and
a correction unit, which is configured to correct the output signals from the plurality of line sensors of the first sensor of the photoelectric conversion device, on the basis of the discrimination information from the image region discrimination unit, with reference to an output signal from the second sensor of the photoelectric conversion device,
wherein the correction unit executes a black character substitution process for each of the output signals from the plurality of line sensors of the first sensor, on the basis of the discrimination information from the image region discrimination unit, with reference to the output signal from the second sensor, and produces the output signals, which are subjected to the black character substitution process, and the output signal from the second sensor.

6. An image input apparatus comprising:
a photoelectric conversion device, which includes a first sensor and a second sensor and is configured to convert an image of an original, the first sensor including a plurality of line sensors having different color filters on light receiving surfaces thereof and the second sensor having no color filter on a light receiving surface thereof;
an image region discrimination unit, which is configured to discriminate an image region of each of output signals from the plurality of line sensors of the first sensor of the photoelectric conversion device, and to output discrimination information; and
a correction unit, which is configured to correct the output signals from the plurality of line sensors of the first sensor of the photoelectric conversion device, on the basis of the discrimination information from the image region discrimination unit, with reference to an output signal from the second sensor of the photoelectric conversion device,
wherein the correction unit executes a black character substitution process for each of the output signals from the plurality of line sensors of the first sensor, on the basis of the discrimination information from the image region discrimination unit, with reference to the output signal from the second sensor, and produces the output signals that are subjected to the black character substitution process.

7. A method for inputting an image comprising:
converting an image of an original with a first line sensor and a second line sensor, the first line sensor including a plurality of line sensors having different color filters on light receiving surfaces thereof and the second line sensor having no color filter on a light receiving surface thereof;
discriminating an image region of each of output signals from the plurality of line sensors of the first line sensor, and outputting discrimination information; and
correcting the output signals from the plurality of line sensors of the first line sensor, on the basis of the discrimination information by the discriminating, with reference to the output signals from the plurality of line sensors of the first line sensor and an output signal from the second line sensor,
wherein the correcting corrects each of the output signals from the plurality of line sensors of the first line sensor by executing a black character substitution process, based on the discrimination information discriminated and output by the discriminating, with reference to the output signal from the second line sensor.

8. A method for inputting an image comprising:

converting an image of an original with a first line sensor and a second line sensor, the first line sensor including a plurality of line sensors having different color filters on light receiving surfaces thereof and the second line sensor having no color filter on a light receiving surface thereof;

discriminating an image region of each of output signals from the plurality of line sensors of the first line sensor, and outputting discrimination information; and correcting the output signals from the plurality of line sensors of the first line sensor, on the basis of the discrimination information discriminated and output by the discriminating, with reference to the output signals from the plurality of line sensors of the first line sensor and an output signal from the second line sensor, wherein the correcting corrects each of the output signals from the plurality of line sensors of the first line sensor on the basis of the discrimination information discriminated and output by the discriminating with reference to the output signal from the second line sensor, by executing a black character substitution process, and produces the output signals that are subjected to the black character substitution process.

9. A method for inputting an image comprising:

converting an image of an original with a first line sensor and a second line sensor, the first line sensor including a plurality of line sensors having different color filters on light receiving surfaces thereof and the second line sensor having no color filter on a light receiving surface thereof;

discriminating an image region of each of output signals from the plurality of line sensors of the first line sensor, and outputting discrimination information; and correcting the output signals from the plurality of line sensors of the first line sensor, on the basis of the discrimination information by the discriminating, with reference to the output signals from the plurality of line sensors of the first sensor and an output signal from the second sensor, wherein the correcting corrects each of the output signals from the plurality of line sensors of the first line sensor on the basis of the discrimination information discriminated and output by the discriminating with reference to the output signal from the second line sensor, by executing a black character substitution process, and produces the output signals that are subjected to the black character substitution process.

* * * * *